Feb. 1, 1966   B. W. YOUNG   3,232,189
APPARATUS FOR COMPACTING SURFACE MATERIAL
Filed May 31, 1962   6 Sheets-Sheet 1

INVENTOR.
BERNARD W. YOUNG
BY *Baldwin & Wight*
ATTORNEYS

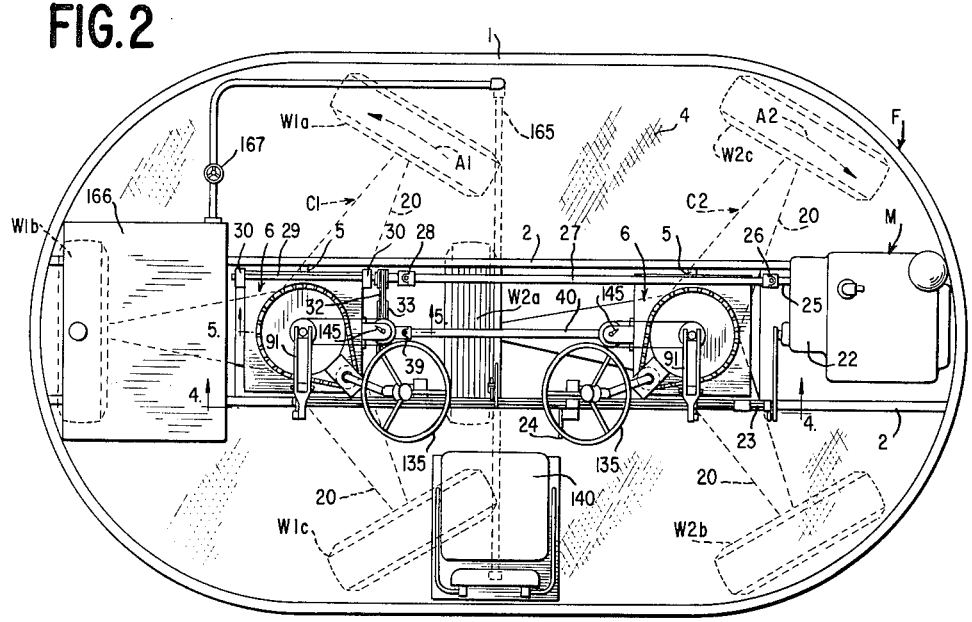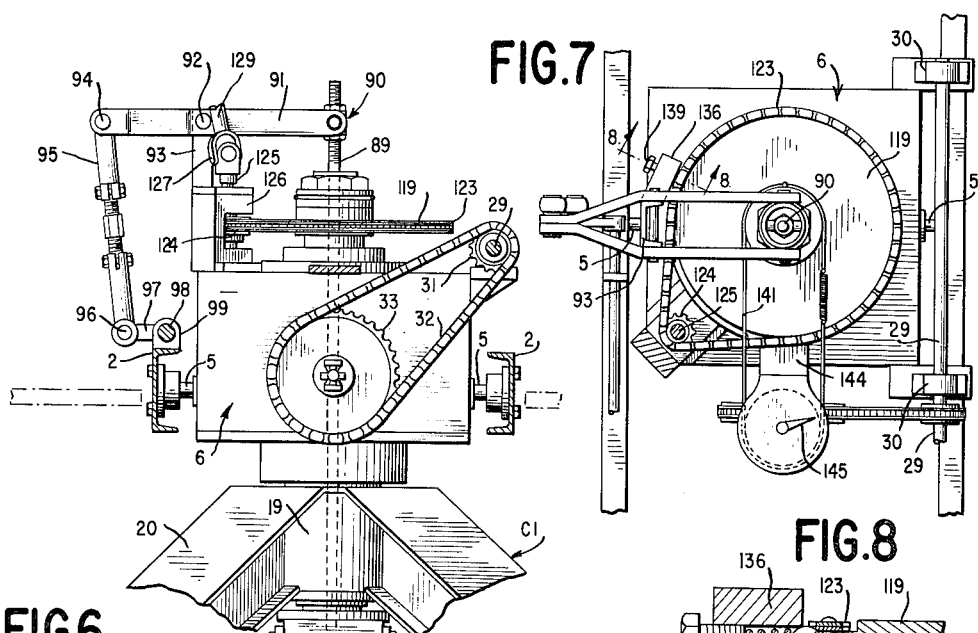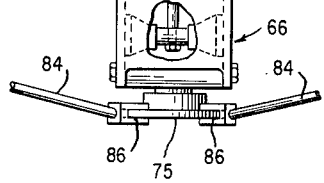

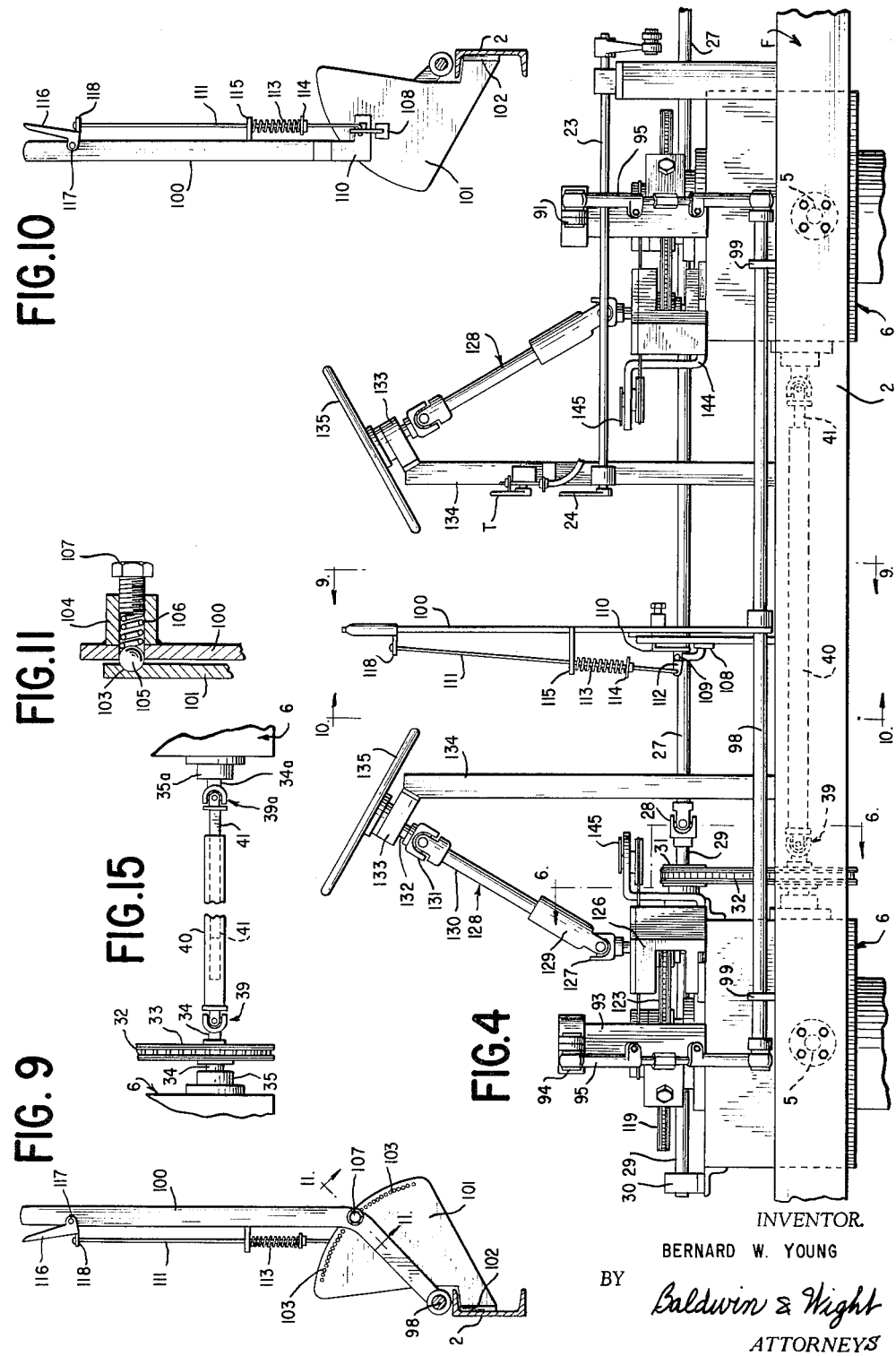

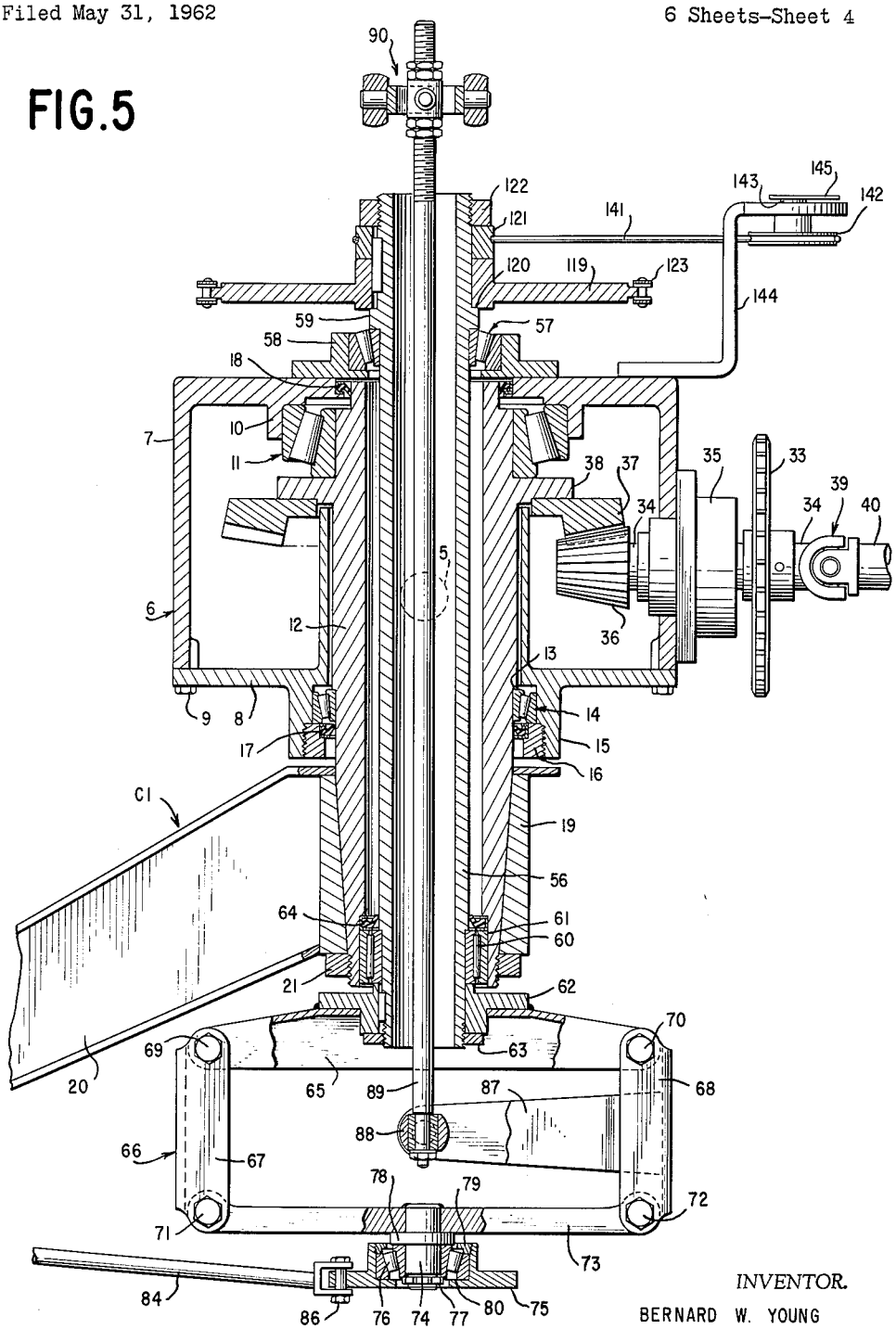

Feb. 1, 1966   B. W. YOUNG   3,232,189
APPARATUS FOR COMPACTING SURFACE MATERIAL
Filed May 31, 1962   6 Sheets-Sheet 5
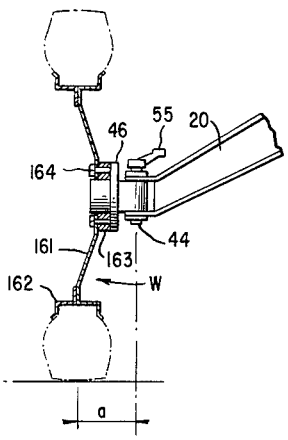
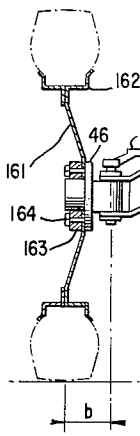
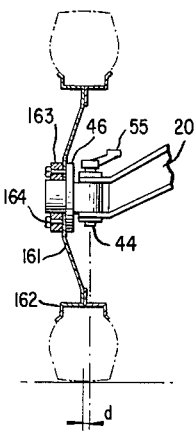
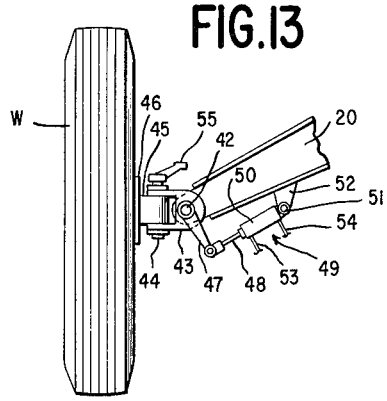
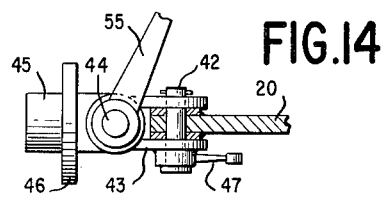
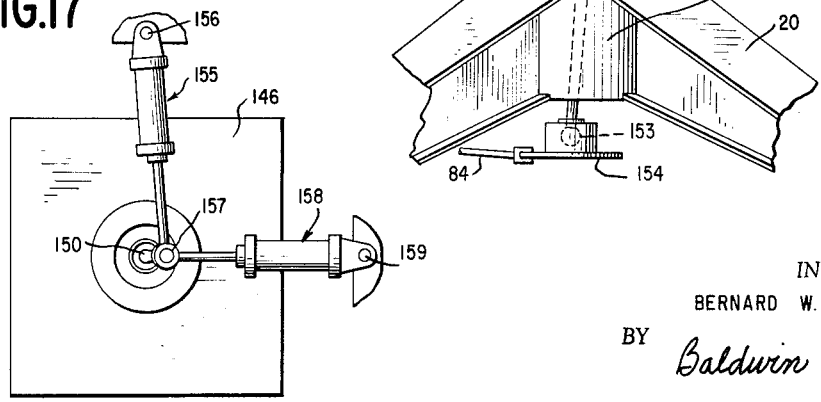
INVENTOR.
BERNARD W. YOUNG
BY Baldwin & Wight
ATTORNEYS Feb. 1, 1966 B. W. YOUNG 3,232,189
APPARATUS FOR COMPACTING SURFACE MATERIAL
Filed May 31, 1962 6 Sheets-Sheet 6
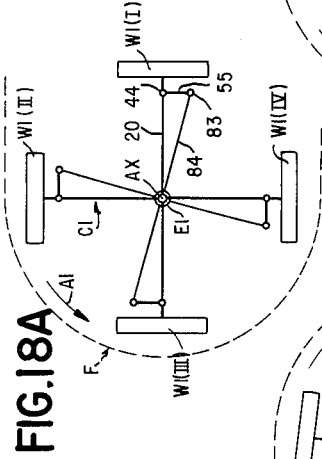
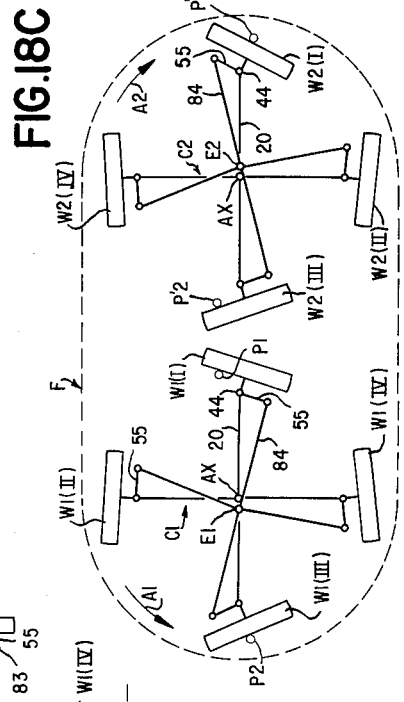
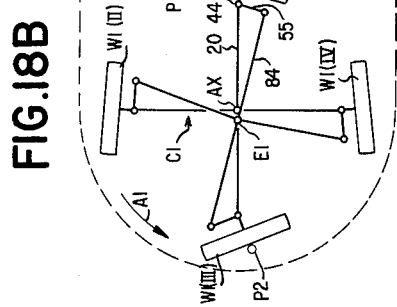
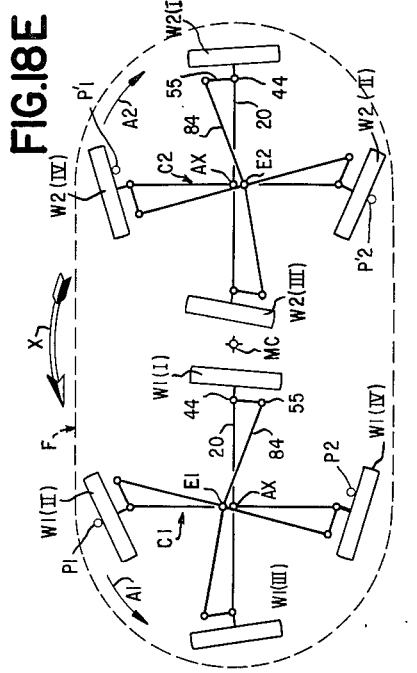
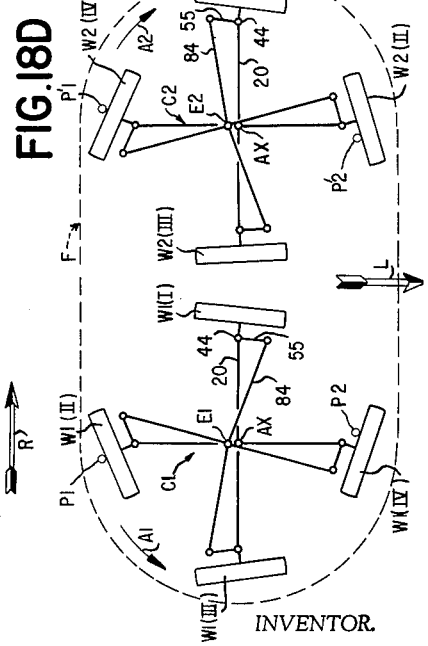
INVENTOR.
BERNARD W. YOUNG
BY
*Baldwin & Wight*
ATTORNEYS United States Patent Office 3,232,189
Patented Feb. 1, 1966

3,232,189
APPARATUS FOR COMPACTING
SURFACE MATERIAL
Bernard W. Young, P.O. Box 2369, Waco, Tex.
Filed May 31, 1962, Ser. No. 198,840
13 Claims. (Cl. 94—50)

This invention relates to apparatus for compacting surface material, particularly material on the ground, for example in the paving or surfacing of roads, streets, air strips, parking areas and the like.

For many years such surfaces have most usually or conventionally been compacted by rolling. Some rolling apparatus used heretofore has included vibrating equipment intended to supplement the weight of the rollers by imparting recurring tapping or impact forces to the surface being packed. Such prior apparatus and the methods of operation thereof have depended almost entirely upon the exertion of force substantially straight downwardly. This has been found not to produce as efficient and uniform compacting and levelling as is desirable. Local waviness or ridging tends to remain, albeit to reduced degree, after rolling, even with vibrating rollers. There is no substantial or really effective exertion of levelling or packing forces in a more or less horizontal plane. In short, the exertion of only vertical forces merely presses the surface material downwardly, although a limited amount of material may incidentally escape, i.e. be squeezed more or less horizontally from under the roller.

An object of the present invention is to provide an apparatus which substantially eliminates the disadvantages of prior art apparatus.

More particularly stated, an object of the invention is to provide an improved apparatus for compacting surface material by which the material is subjected repeatedly to distributing and packing forces exerted in different, in fact multitudinous, directions, including horizontal and vertical directions, and directions having both horizontal and vertical components.

Another object of the invention is to provide an improved apparatus by which material being compacted is subjected to twisting about substantially vertical axes which change or move continuously while the material is also being subjected to rolling which, in itself, changes in direction.

The achievement of these objects in accordance with the invention results in the surface material being kneaded and worked into a uniformly distributed and packed mass.

Other objects of the invention are directed to the provision of apparatus of simple and rugged construction and which has great versatility and maneuverability, being capable of being steered and controlled to move in precise paths, for example along and close to building walls and curbs adjoining a surface being worked.

Other objects of the invention will become apparent from a reading of the following description, the appended claims and the accompanying drawings, in which:

FIGURE 2 is a top plan view of the apparatus shown in FIGURE 1;

FIGURE 4 is a view in elevation on the line 4—4 of FIGURE 2, on an enlarged scale;

FIGURE 5 is a fragmentary vertical section on the line 5—5 of FIGURE 2, on an enlarged scale;

FIGURE 6 is a fragmentary vertical section on the line 6—6 of FIGURE 4, on an enlarged scale;

FIGURE 7 is a top plan view of the construction shown in FIGURE 6;

FIGURE 8 is a fragmentary section on the line 8—8 of FIGURE 7, on an enlarged scale;

FIGURE 9 is a section on the line 9—9 of FIGURE 4, with parts of a manually operable control mechanism shown in elevation;

FIGURE 10 is a section on the line 10—10 of FIGURE 4, showing parts shown in FIGURE 9, but as viewed in the opposite direction;

FIGURE 11 is an enlarged detailed section on the line 11—11 of FIGURE 9;

FIGURES 12A, 12B, 12C and 12D are respectively vertical sections through ground engaging wheels in planes transverse to their axes of rotation, showing the wheels in different positions of adjustment radially with respect to a rotor or chassis on which the wheels are mounted;

FIGURE 13 is a fragmentary elevational view showing mechanism for mounting and adjustably positioning a wheel relatively to the rotor or chassis on which it is mounted;

FIGURE 14 is a view, partly in top plan and partly in horizontal section, of certain of the parts shown in FIGURE 13;

FIGURE 15 is a fragmentary elevational view of a coupling shaft and universal joint arrangement for transmitting drive between two gear boxes;

FIGURE 16 is a fragmentary view, partly in elevation and partly in section, of a modified eccentric adjusting steering mechanism;

FIGURE 17 is a top plan view of some of the parts shown in FIGURE 16; and

FIGURES 18A, 18B, 18C, 18D and 18E are diagrams illustrating different settings of control mechanism for determining travel or non-travel of the apparatus in its entirety, and for determining the direction of travel or movement of the apparatus over the ground when travel or movement is required.

Figure 1:
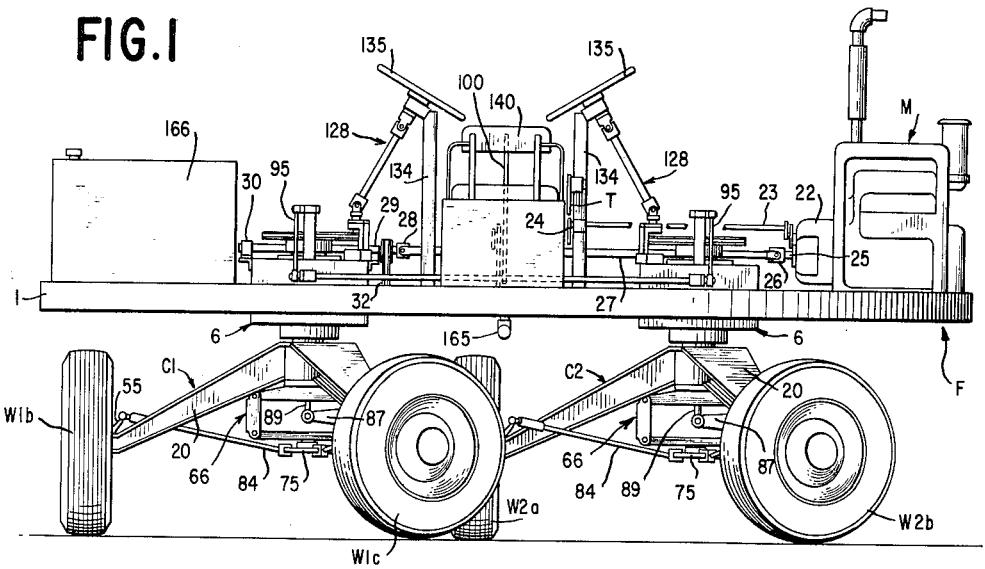
FIGURE 1 is a side elevational view of a preferred form of apparatus embodying the invention.
Figure 3:
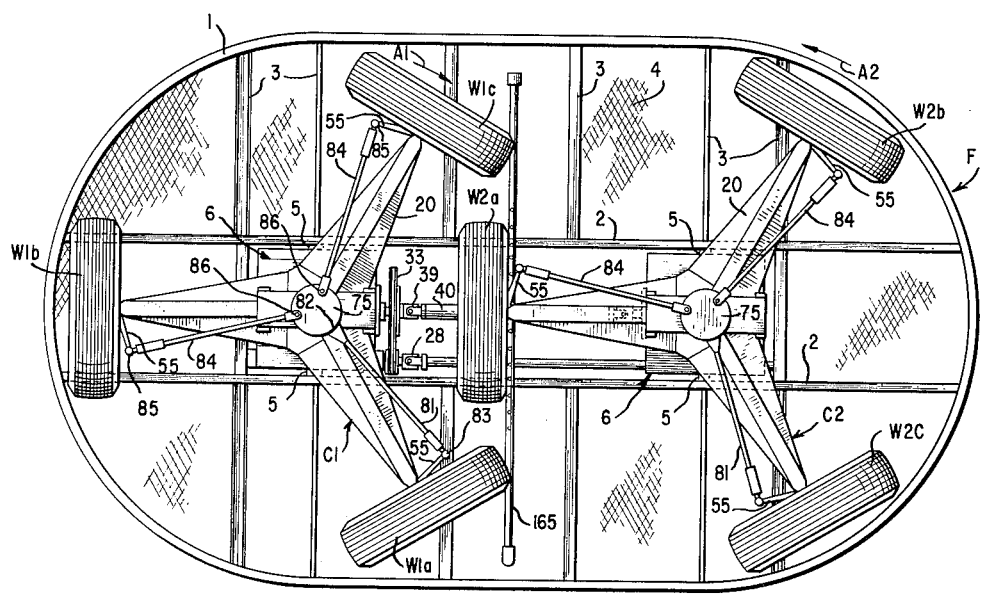
FIGURE 3 is a bottom plan view.

In its general nature, the representative embodiment of the invention illustrated in the drawings includes a main frame F and two chassis C1 and C2 mounted to rotate underneath the frame about vertical axes spaced fore-and-aft of the latter, that is from right to left as viewed in FIGURES 1, 2 and 3. Journalled on each of the chassis is a plurality of circumferentially deployed wheels, hereinafter generally and collectively referred to by the designation W, but in other instances referred to by the specific designations W1a, W1b, and W1c as to the wheels mounted on the chassis C1, and by the designations W2a, W2b, and W2c, as to the wheels mounted on the chassis C2.

The wheels W are so mounted on their respectively associated chassis that during a revolution of the latter each of at least certain of the wheels will shift sequentially from a position generally tangential to the path of rotation of the wheels to a position skewed in one direction from the tangential position, then back in the opposite direction through the tangential position to a position skewed from the tangential position in the opposite direction, and then back through the tangential position, and so on according to a predetermined cyclic pattern. The two chassis C1 and C2 rotate in opposite directions as indicated by the arrows A1 and A2 in FIGURES 2, 3 and 18A–18E inclusive.

The sum of the radial distance between a wheel W on one chassis and the axis of rotation of that chassis, and the radial distance between a wheel on the other chassis and the axis of rotation of that other chassis is greater than the horizontal distance between the axes of rotation of the two chassis. Thus, the radial distances between the wheels W on each chassis and the associated axes of chassis rotation are so related to the distance between the two chassis axes of rotation that the paths of rotation of the wheels on the two chassis overlap. Wheels on one chassis recurrently become interposed between wheels on the other chassis, and vice versa, where the paths of wheel travel overlap. The rotations of the two chassis are so interrelated that wheels in overlapping or interposed positions do not touch one another.

The wheels journalled on both chassis C1 and C2 work upon each bit of surface over which the apparatus travels, not only with a rolling action exerted in opposite directions but, very importantly, with an additional action in the nature of applying a twisting force. With wheels equipped with resilient tires, there is a substantial and generally rectangular area of contact of each tire with the surface being compacted. As each wheel moves about the axis of rotation of the chassis, the wheel tire exerts a primary twisting force on the surface material. The compounding of the application of rolling force and pressure in different directions and the twisting forces produces an improved and highly efficient compacting effect upon the surface material being treated.

The actions of the wheels W upon the surface material may be varied by causing the wheels to be skewed from their substantially tangential positions during rotation with the chassis. The apparatus includes mechanism for changing the location, in the general path of rotation of each wheel with its associated chassis, where that wheel is twisted or skewed through its tangential position. This makes it possible to control the direction in which the apparatus is propelled by rotation of the chassis and dispenses with the necessity of using a towing tractor or the like. Additionally, the amount of skewing of each wheel may be varied with controlling of the twisting force exerted on the surface material.

More particularly considering the illustrated embodiment of the invention, the frame F is fabricated of structural metal members including a marginal element 1, two longitudinal elements 2, and a plurality of transverse elements 3, all of which may be secured to form a unitary frame in any suitable manner, as by welding. A metallic grating 4 is carried by the frame F to provide a floor.

The structures for rotatably mounting the chassis C1 and C2 on the frame F are similar, so that a description of the mounting for the chassis C1 will suffice. Referring to FIGURES 1–7, the two longitudinal frame members 2, 2 are provided with fixed opposed trunnions 5, 5 which together mount a gear and bearing box unit 6 for slight floating movements relative to the frame F. As shown in FIGURE 5, the bearing box 6 includes an inverted cup-shaped upper part 7 and a lower closure and bottom wall part 8 secured to the part 7 by bolts 9. The inside of the top wall of the bearing box part 7 is formed with a flange 10 which receives the outer race of a tapered roller bearing assembly 11, the inner race of which is mounted on the upper end of a hollow drive shaft 12 which extends downwardly through and below the bottom closure 8 of the bearing box 6. At a level below the closure plate 8, the hollow drive shaft 12 is formed with a shoulder 13 which rests upon the inner race of a tapered roller bearing assembly 14 surrounding the shaft 12, the outer race of the bearing assembly 14 being received within a flange 15 extending downwardly from the closure plate 8. A threaded ring 16 screwed into the flange 15 provides a support for the outer race of the bearing 14 so that the latter provides vertical support for the shaft 12 in the manner of a thrust bearing. Lower and upper seals 17 and 18 prevent escape of lubricant from the interior of the bearing box 6 along the outside of the hollow drive shaft 12.

The rotor or chassis C1 is of spider-like formation, including a hub 19 and three radially extending arms 20. The hub 19 is internally tapered to fit the correspondingly tapered lower end of the drive shaft 12. A ring nut 21 threaded onto the lower end of the shaft 12 clamps the chassis hub 19 to the shaft 12, a key (not shown) being provided if desired between the hub and the lower end of the shaft 12.

As previously stated, the chassis C2 is mounted on the frame F similarly to the mounting of the chassis C1. Illustrated parts for mounting the chassis C2 which correspond to parts for mounting the chassis C1 are designated by the same reference characters as those designating parts mounting the chassis C1. Thus, there are shown a bearing box 6 and trunnions 5 for mounting the chassis C2 (FIGURES 2, 3 and 4).

Power for rotating both chassis driving shafts 12 is provided by a single internal combustion motor M. The motor M is equipped with a clutch mechanism having a housing 22. The clutch mechanism is controlled by a shaft 23 extending to a clutch operating lever 24 as shown in FIGURES 1, 2 and 4. The clutch output shaft 25, which may be operatively connected to or disconnected from the motor M, transmits drive through a universal coupling 26, an operating shaft 27 and a universal coupling 28 to a shaft 29 journalled to rotate in bearings 30 fixed to the bearing box 6 at the left of the apparatus, as viewed in FIGURES 1, 2 and 4. A sprocket 31 secured to the shaft 29 transmits drive through a chain 32 to a sprocket 33 fixed to a short shaft 34 journalled in a bearing 35 (FIGURE 5) mounted in the side wall of the bearing box 6. The end of the shaft 34 within the bearing box is fitted with a bevelled pinion 36 which meshes with a bevelled ring gear 37 secured in any suitable manner to a flange 38 on the hollow drive shaft 12.

In operation, when the clutch is engaged, drive is transmitted through the shaft 25, universal coupling 26, shaft 27, universal coupling 28, shaft 29, sprockets 31 and 33 and chain 32, shaft 34, and pinion and gear mechanism 36, 37 to the hollow drive shaft 12 for rotating the latter and its associated chassis C1 in the direction of the arrows A1 in FIGURES 2 and 3 and FIGURES 18A–18E.

The chassis C2 is driven oppositely to the chassis C1, that is in the direction of the arrows A2 in FIGURES 2 and 3 in FIGURES 18A–18E. For this purpose, the shaft 34 is connected by a universal joint 39 to a shaft sleeve 40, which, as shown in FIGURE 15, receives for sliding movement an inner shaft 41 splined or otherwise so connected to the shaft sleeve 40 as to permit relative longitudinal movement between the shaft parts 40 and 41 but to cause rotation of the shaft parts in unison. A universal joint 39a couples the inner shaft 41 to a shaft 34a which corresponds to the shaft 34 and extends through a bearing 35a into the bearing box 6 above and associated with the chassis C2. The shaft 34a carries a pinion (not shown) corresponding to the pinion 36 which engages a ring gear corresponding to the ring gear 37 for driving the hollow shaft 12 which carries and rotates the chassis C2. Since the respective bevelled pinions engage the associated ring gears on relatively opposite sides of the axes of rotation of the two hollow shafts 12, the latter will be operated in opposite directions.

In operation, unevenness of the surface being compacted will cause the chassis C1 and C2 to rock slightly relatively to the frame F as is permitted by the trunnions 5. Rocking of the chassis and their associated bearing boxes 6 will not strain or interfere with operation of the drive transmitting mechanism, since the splined shaft assembly 40 and 41 and the several universal joints provide a drive transmitting mechanism which can accommodate itself to slight changes in the longitudinal direction of the shaft assembly 40, 41 resulting from the relative rocking between the bearing boxes 6, 6 which is permitted by the trunnions 5, 5.

A typical mounting for the wheels, or at least some of them, is illustrated in FIGURES 13 and 14, which may be considered in connection with other figures, especially FIGURES 1 and 3. As shown in FIGURES 13 and 14, a chassis arm 20 is provided at its outer end with a pintle 42 having its axis horizontal and extending generally tangentially to the circular path of movement of the chassis arm outer end. A clevis or yoke member 43 is pivoted on the pintle 42 and itself carries a pintle 44 with its axis extending generally vertically and off-set from the axis of the pintle 42. An axle unit 45 is pivotally carried by the vertical pintle 44 and journals the hub 46 of the wheel W.

Fast with the yoke 43 is an arm 47 which is pivotally connected to the movable rod 48 of a fluid pressure jack 49, the cylinder 50 of which is pivoted at 51 to a bracket 52 fast with the chassis arm 20. The cylinder 50 is fitted with fluid pressure lines 53 and 54 through which fluid under pressure may be supplied and exhausted in any suitably controlled manner for extending or retracting the movable rod 48 so as to rock the arm 47 and yoke 43 about the pintle 42. Rocking of the yoke 43 in this manner will tilt the axle 45 from a horizontal position to an inclined position so that the position of the wheel W may be varied from a strictly vertical position to an off-vertical position.

For shifting the wheel W from its position substantially tangential to the path of rotation with the associated chassis to skewed positions, an arm 55 is made fast with the vertical pintle 44 and extends transversely to the pintle axis. Rocking of the arm part 55 and pintle 44 will shift the wheel about a vertical axis.

Separate mechanisms are provided for rocking the arms 55 associated with the wheels mounted on the respective chassis C1 and C2. These mechanisms are, however, similar, so that a description of the shifting mechanism associated with the chassis C1 will suffice. As shown in FIGURE 5, a hollow steering shaft 56 is mounted concentrically within the hollow drive shaft 12 which mounts the chassis C1 on the frame F. The upper end of the steering shaft 56 is journalled for rotation and held against downward movement by a roller bearing assembly 57, the bearing outer race being received in a ring 58 fast with the top of the bearing box 6, and the inner bearing race abutting against a flange 59 on the shaft 56. The lower end of the steering shaft 56 is journalled within the lower end of the hollow drive shaft 12 by a needle bearing assembly 60, the outer race of which is received in a counterbore 61 in the hollow shaft 12. The inner race of the bearing assembly 60 is held on the shaft 56 by a disk 62 keyed to the shaft 56 and held on the shaft by a ring nut 63. A seal 64 is interposed between the lower ends of the shafts 12 and 56 immediately above the bearing assembly 60.

As will be described hereinafter, the shaft 56 may be rotated about its axis relatively to the frame F for steering the apparatus in its travel over the ground. For the present part of the description, however, the shaft 56 may be considered as being stationary and as serving as a support for the mechanism for rocking the wheel skewing arms 55. This mechanism, carried by the steering shaft 56, includes a relatively fixed bar 65 secured, as by welding, to the disk 62 and forming part of a parallelogram linkage generally designated 66. The parallelogram linkage further includes two links 67 and 68 pivoted at 69 and 70 to opposite ends of the relatively fixed bar 65 and pivotally connected at 71 and 72 respectively to opposite ends of a relatively movable or floating bar 73.

An eccentric device is carried by the floating bar 73 and, as shown in FIGURE 5, comprises a pin member 74 fixed to the floating bar 73 and being capable of being positioned either concentrically with or eccentrically to the axis of rotation of the chassis C1 by movement of the floating bar 73. The eccentric device further includes a disk member 75 relatively rotatably mounted on the pin 74 by a roller bearing assembly 76, the inner race of which is clamped by a retainer nut 77 against a flange 78 on the pin 74. The outer race of the bearing assembly 76 is held in place in the disk 75 by a ring 79 threaded into the disk and pressing the outer race against a shoulder 80 formed on the disk.

The eccentric device 74, 75 is connected to the several wheel skewing arms 55 as best shown in FIGURES 3 and 5. As shown in FIGURE 3, one rod 81 is fixed at 82 to the eccentric disk 75, as by welding, and is pivotally connected at 83 to the arm 55 associated with the wheel W1a.

The arms 55 associated with the other two wheels W1b and W1c journalled on the chassis C1 are connected to the eccentric disk member 75 by rods 84 which are pivoted at 85 to the arms 55 and are pivoted at 86 to the disk 75.

In operation, when the parallelogram linkage is adjusted to the position shown in FIGURE 5 in which the eccentric device 74, 75 is concentric with the axis of rotation of the chassis C1, the disk 75 will rotate idly on the pin 74 in consequence of rotation of the chassis C1 without partaking of any translatory or orbital movement so that the connecting bars 81 and 84 will not be moved radially and the positions of the wheels W with respect to their tangential positions will not be changed. Thus, all three wheels W will, in effect, run around a constant and unchanging circular track, providing the apparatus as a whole does not move. If the eccentric device 74, 75 is moved to a position eccentric with respect to the axis of rotation of the chassis C1, rotation of the chassis will cause the eccentric device to move in an orbit about the chassis axis of rotation so as to transmit substantially radial movements to the rods 81 and 84, and thereby cyclically rock the arms 55 sequentially in opposite directions. This will move each wheel W from a position substantially tangential to the path of orbital movement of the wheels to a position skewed in one direction from the tangential position, then back through the tangential position to a position skewed in the opposite direction and then back to and through the tangential position, and so on.

As previously stated, the mechanism for rocking the skewing arms 55 associated with the wheels W mounted on the chassis C2 is similar to that described with reference to the wheels mounted on the chassis C1. Similar reference characters are applied to similar parts of the two mechanisms in FIGURES 1 and 3.

A common control means is provided for simultaneously shifting the floating links 73 of the two parallelogram linkages associated respectively with the chassis C1 and C2. Considering the mechanism associated with the chassis C1, and again with particular reference to FIGURE 5, an arm 87 is fast with the pivoted link 68 of the parallelogram linkage 66. The free end of the arm 87 is connected through a universal joint 88 to the lower end of an operating rod element 89 extending centrally through and being reciprocable within the hollow steering shaft 56. As best shown in FIGURES 5, 6 and 7, the upper end of the rod 89 is fitted with a universal joint 90 which may be adjusted vertically along the threaded end of the rod 89. The joint 90 connects the rod element 89 to one end of a lever 91 which is pivotally mounted at 92 on a bracket 93 extending upwardly from the bearing box 6. The other end of the lever 91 is pivoted at 94 to the upper end of an adjustable link 95, the lower end of which is pivoted at 96 to an arm 97 fast with a shaft 98 mounted to rock in bearings 99 on the frame F, as shown in FIGURES 4 and 6.

The shaft 98 is rockable manually by a lever 100 fixed to the shaft. Rocking of the lever 100 and shaft 98 will rock the arm 97, transmit force to the link 95 and rock the lever 91 to raise or lower the rod 89, thereby rocking the arm 87 and parallelogram link 68 to displace the floating bar 73 and eccentric device 74, 75 horizontally. As shown in FIGURES 4 and 6, the shaft 98 is connected to an adjustable link 95 and lever 91 associated with the eccentric shifting mechanism for the wheels on the chassis C2. Thus, operation of the hand lever 100 and shaft 98 will adjust the eccentric devices associated with the two chassis conjointly.

Mechanism illustrated particularly in FIGURES 4, 9, 10 and 11 is provided for releasably holding the hand lever 100 and consequently the eccentric adjusting devices in selected positions. This mechanism includes a sector plate 101 secured at 102 to one of the longitudinal frame members 2 and having an arcuate series of holes or depressions 103. Fast with the lever 100 is a hollow boss 104 housing a ball 105 and spring 106 which urges the ball 105 into contact with the sector plate 101. A screwed plug 107 may be set in adjusted position within the boss 104 to vary the pressure exerted by the spring 106 on the ball 105, and hence determine the force required to dislodge the ball from a depression or seat 103 when shifting the lever 100.

Shifting of the lever 100 is facilitated or eased by relieving some of the pressure exerted by the ball 105 against the seat 103 in which the ball is received at any time. As shown in FIGURES 4, 9 and 10, a pressure plate 108 is pivoted at 109 on a bracket or extension 110 carried by the lever 100 and extending adjacent the face of the sector plate 101 opposite that formed with the recesses 103. A rod 111 is pivoted at its lower end to an arm 112 fast with the pressure plate 108 and is urged downwardly by a spring 113 interposed under compression between a spring seat 114 on the rod 111 and an abutment arm 115 which is secured to the lever 100. The spring 113 urges the arm 112 and the pressure plate 108 to rock counterclockwise as viewed in FIGURE 4, causing the pressure plate to bear against the sector plate 101 and consequently pressing the lever 100 toward the opposite side of the sector plate, that is the right side as viewed in FIGURE 4, thus enabling the ball 105 to exert a maximum seating pressure within the depression 103. So much of the pressure exerted by the ball 105 on the sector plate 101 which is attributable to the force of the spring 113 may be relieved by operating a handle 116 pivoted at 117 to the lever 100 and having an ear 118 connected to the upper end of the rod 111. When the handle 116 is operated, as by being rocked counterclockwise in FIGURE 10, the rod 111 will be lifted against the pressure exerted by the spring 113 so as to rock the arm 112 and pressure plate 108 clockwise as viewed in FIGURE 4, thus displacing the pressure plate from engagement with the sector plate 101. This will enable the ball pressing spring 106 to flex the lever 100 somewhat to the right as viewed in FIGURES 4 and 11 with resultant diminishing of the pressure exerted by the ball 103 on the sector plate 101. The lever 100 may then be rocked easily to a new position with the ball 105 received in a different one of the seats 103.

In addition to varying the amounts of eccentricity of the eccentric devices 74, 75 associated with the two chassis C1 and C2, the directions of eccentricity relative to a horizontal line joining the chassis axes of rotation, that is the directions of displacement of the eccentric devices from concentric positions at the axes of rotation of the chassis, may be varied in a manner to control the movement of the apparatus as a whole over the surface being compacted. With reference to FIGURE 5, in which the eccentric device 74, 75 is shown in its concentric position, that is coaxial with the axis of rotation of the chassis C1, the hollow steering shaft 56 may be rotated relatively to the bearing box 6 and frame F by virtue of its mounting in the anti-friction bearings 57 and 60. Rotation of the steering shaft 56 can be resorted to for the purpose of adjustably turning and disposing the lower bar 73 of the parallelogram linkage at any desired angle with respect to the machine frame. Thus the parallelogram linkage and the floating bar 73 may occupy positions as shown in FIGURE 5 in which the floating bar 73 is substantially parallel to the longitudinal center line of the machine. The parallelogram linkage and floating bar 73 may be turned by the shaft 56 to be disposed at right angles to the longitudinal center line of the machine, or to be disposed at any intermediate angle.

Mechanism for turning the steering shaft 56 includes a toothless sprocket 119 mounted on the upper end of the shaft 56 against a shoulder 120 and held in place by a collar 121 forced downwardly against the sprocket hub by a nut 122. As shown in FIGURES 2 and 5–8, a chain 123 is trained around the toothless sprocket 119 and a toothed sprocket 124 which is fast with a shaft 125 journalled in a bearing 126 carried by the bracket 93. A universal joint 127 connects the shaft 125 to an upwardly inclined shaft 128 having telescopic inner and outer splined parts 129 and 130. At its upper end, the inclinder shaft 128 is connected through a universal joint 131 to a short shaft 132 journalled in a bearing 133 supported on a post 134 which is fixed to and extends upwardly from the frame F. A steering wheel 135 is fixed to the short shaft 132. By turning the steering wheel 135, motion is transmitted through the shaft 128 and pinion 124 to the chain 123 for rotating the sprocekt 119 to turn the hollow steering shaft 56 and thus dispose the parallelogram floating bar 73 in a desired position. Preferably, means are provided for steadying the steering mechanism so as to avoid undue tendency of the steering wheel 135 to hunt back and forth. As shown in FIGURE 8, a block 136 carried by the bracket 93 is formed with a recess which receives a ball 137 pressed against the chain 123 by a spring 138 interposed between the ball 137 and a screw plug 139 which may be turned to vary the pressure exerted by the ball on the chain 123, and thus determine the amount of effort which must be exerted upon the steering wheel 135 to turn the hollow steering shaft 56.

The mechanism for steering, that is changing the direction of the eccentricity of the eccentric device associated with the chassis C2 is similar to that described above, and similar reference characters are therefore applied to corresponding parts of the two steering mechanisms in FIGURES 1, 2 and 4. As shown in these figures, the two telescopic steering shafts 128 are inclined toward one another and toward the center of the machine, being positioned on opposite sides of the arc of swinging of the control lever 100. The two steering wheels 135 and the control lever 100 are so disposed in relation to an operator's seat 140 as to be readily accessible to the operator. So too, the clutch operating handle 24 and a throttle handle T are disposed adjacent to the seat 140.

For assisting the operator in steering the apparatus, requiring changing the directions of eccentricity of the two eccentric devices 74 and 75, means are provided for indicating the rotated positions of the steering shafts 56 at locations adjacent to the operator's seat 140 and steering wheels 135. Referring to FIGURES 2, 4, 5 and 7, the collar 121 at the top of the hollow steering shaft 56 is formed with a groove which receives a belt or band 141 trained around a pulley 142 fast with a shaft 143 journalled on a bracket 144 mounted on the top of the bearing box 6. A pointer 145 fixed to the shaft 143 is rotatable in response to rotation of the steering shaft 56 so as to indicate the position of the parallelogram linkage.

FIGURES 16 and 17 disclose a modified form of mechanism for adjusting both the direction and the amount of eccentricity of an eccentric device corresponding in function to the eccentric device 74, 75. As shown in FIGURES 16 and 17, a bearing box 146, which may be mounted by trunnions on the machine frame similarly to the bearing box 6, supports a hollow shaft 147 for rotation about a vertical axis. The shaft 147 is rigidly connected to the chassis C1. A bevel pinion 148, which corresponds to the bevel pinion 36 shown in FIGURE 5, transmits chassis rotating drive to a bevel ring gear 149 which corresponds to the ring gear 37 shown in FIGURE 5.

An operating rod 150 extends downwardly through the hollow drive shaft 147 and is provided substantially at its midpoint with a ball 151 which has universal pivotal movement engagement with the inner race of a needle bearing assembly 152 the outer race of which is mounted within the shaft 147. The lower end of the operating rod 150 is provided with a ball 153 having universal movement connection with an eccentric device 154 to which the rods 81 and 84 may be pivoted, one of the rods 84 being shown pivoted to the eccentric device 154 in FIGURE 16.

Adjustment of both the amount of eccentricity and the direction of eccentricity of the eccentric device 154 is effected by rocking the operating rod 150, the degree of rocking determining the amount of eccentricity and the direction of rocking determining the direction of eccentricity. FIGURES 16 and 17 show one form of mechanism for operating the rod 150, both as to extent of movement and direction of movement, as comprising two fluid pressure jacks disposed so that their lines of action are substantially at right angles to one another. One jack 155 has its cylinder pivoted at 156 on the frame and has its extensible piston rod pivoted to the upper end of the operating rod 150 by a ball and socket joint 157. The other jack 158 has its cylinder pivoted at 159 on the frame and has its piston rod connected through a ball and socket joint 160 to the upper end of the operating rod 150. By controllably extending and retracting the jack rods more or less, both the direction and the amount of displacement of the eccentric device 154 about different horizontal axes can be determined.

FIGURES 12A–12D show various mountings of a wheel W on the chassis arm 20 for providing different radial spacings of the wheel rim from the chassis axis of rotation. In FIGURE 12A, the wheel hub 46 is connected to a wheel web 161 terminating in a rim flange 162 by means of a spacer collar 163 and bolts 164. The wheel web 161 is offset axially between its inner portion connected to the hub 46 and its outer or peripheral portion terminating in the flange 162. With the web offset being directed inwardly toward the arm 20, and with the spacer collar 163 interposed between the web 161 and the flange on the hub 46, the rim 162 is positioned at a maximum distance from the axis of rotation of the chassis. For comparison with other adjusted positions of the wheel, it is noted that the radial distance between the axis of the pintle 44 and the center of the rim 162 is denoted by the dimension line $a$ and is relatively large.

FIGURE 12B shows an assembling or set up of the wheel and associated parts for disposing the wheel rim a little closer to the axis of rotation. In this assembly, the offset of the web 161 is still toward the chassis axis of rotation, but the spacing collar 163 is on the outside of the web 161 so that the latter abuts directly against the hub flange. Here the distance between the pintle 44 and the center of the rim 162, denoted $b$, is somewhat less than the distance $a$ in FIGURE 12A, and the rim accordingly is closer to the axis of rotation.

In FIGURE 12C, the web 161 is reversed so that the web offset extends radially outwardly, and the spacing collar 163 is located between the web and the hub flange. The distance $c$ between the pintle 44 and the center of the rim 162 is less than the distance $b$ in FIGURE 12B.

Finally, FIGURE 12D shows the web offset directed outwardly as in FIGURE 12C, but shows the spacing collar 163 on the outside of the web with the latter abutting directly against the hub flange. Here the distance $d$ between the pintle 44 and the center of the wheel rim is a minimum.

In the rolling and compacting of certain kinds of surface material it frequently is desirable to spray or sprinkle liquid, e.g. water, on the surface as the compacting proceeds. For this purpose, a spray pipe 165 is mounted to have a perforated portion thereof located transversely directly under the frame F, substantially midway between the two chassis mountings, flow of liquid from a tank 166 being controlled by a valve 167.

*Operation*

FIGURES 18A–18E are diagrams illustrating the actions of the wheels during operation, as viewed from above. FIGURE 18A shows the movements of a wheel W carried by the chassis C1 when the eccentric device E1, corresponding to the eccentric devices 74, 75 in FIGURE 5 and 154 in FIGURES 16 and 17, is positioned concentrically with the axis of rotation AX corresponding to the axis of the shaft 12 in FIGURE 5 and the shaft 147 in FIGURE 16. FIGURES 18B–18E show the axes AX related to the wheels associated with both chassis C1 and C2 with different relative displacements or directional settings of the eccentric device E1 associated with the chassis C1 and the eccentric device E2 associated with the chassis C2, the amounts or degrees of eccentricity of the devices E1 and E2, however, being substantially the same throughout FIGURES 18B–18E.

FIGURE 18A shows diagrammatically four successive positions of a single wheel W1 on the chassis C1, and not four different wheels on the chassis. The eccentric device E1 is shown as being concentric with the axis of rotation AX. Consequently, as the chassis C1 rotates the single wheel indicated will remain in a position or plane substantially tangential to the path of orbital movement of the wheel about the axis AX, four different positions spaced at approximately 90° from one another being shown at W1(I), W1(II), W1(III) and W1(IV). It is apparent that as the wheel passes from one indicated position to the next in the direction of the arrow A1 through intermediate positions, the wheel will maintain its tangential plane positions. The chassis C2 is not illustrated in FIGURE 18A, but it will be understood that with the eccentric device E2 of the chassis C2 positioned concentrically with the axis of rotation AX of the chassis C2, the wheel on the chassis C2 will also maintain a tangential plane position while tracking in a circular path. The single wheel indicated in FIGURE 18A is, of course, representative of the other two wheels embodied in the actual construction, these other two wheels partaking of the same tracking movement as the indicated wheel. Since all of the wheels on both chassis C1 and C2 track more or less truly in a circular path to which the wheel planes remain tangential there is little, if any, tendency to exert horizontal force tending to impart translatory movement to the machine frame F, and the latter will remain substantially stationary with the wheels running continuously substantially in the same tracks. Nevertheless, due to the rectangular surface area of contact of each wheel with the surface, a primary twisting force will be exerted on the latter.

FIGURE 18B shows the eccentric devices E1 and E2 adjusted or displaced directionally from the axes of rotation AX of the respective chassis so as to drive the entire machine, represented by the frame F, toward the right, that is in the direction of the arrow R. In this positioning of the parts, the eccentrics E1 and E2 are both displaced substantially equal amounts to the left of their associated axes of rotation AX. The chassis C1 rotates counterclockwise as indicated by the arrow A1, and the chassis C2 rotates clockwise as indicated by the arrow A2. The arm 55 associated with the wheel on the chassis C1 projects clockwise from the associated pintle 44, whereas the arm 55 associated with the wheel on the chassis C2 projects counterclockwise from the associated pintle 44. Thus, the arms 55 associated with the wheels on the two chassis respectively project from their associated pintles 44 in a direction which is opposite to the direction of rotation of the particular chassis. The opposed directional extents of the arms 55 associated with the wheels on the chassis C1 and C2 are thus reversed, so to speak, as is apparent also from the constructional illustration in FIG. 3 which, it will be remembered, is a bottom plan view whereas FIGURE 18B is, in effect, a top plan view.

For tracing the movements of the wheel associated with the chassis C1 during an orbital movement of the wheel about the axis AX, the first position may be considered as that shown at W1(I). In this position, the wheel is very substantially skewed from its tangential plane position, being inclined upwardly from left to right as viewed on the drawing sheet. As the chassis C1 rotates in the direction of the arrow A1, the eccentric mechanism and rod 84 rock the wheel about the pintle 44 through positions of progressively lesser skew or inclination, as indicated by the materially less skewed position at W1(II). As the wheel proceeds orbitally from position W1(II) to position W1(III), the skewing is, in effect, reversed, becoming inclined upwardly and from right to left as viewed on the drawing sheet. During its further progress from position W1(III) to position W1(IV) the wheel skewing remains in kind the same as in position W1(III) but to a lesser degree. In moving orbitally from position W1(IV) to position W1(I) the wheel again passes through a tangential plane position and becomes skewed to the W1(I) position. Thus, during a single orbit about the axis AX, the wheel on the chassis C1 moves from a tangential plane position to a position skewed in one direction, then moves oppositely back through the tangential position to a position skewed in the opposite direction, then moves in the first direction through the tangential plane position to the first skewed position, and so on cyclically. This occurs while the wheel is also performing a modified rolling action on the surface material, the net result being continuously to exert a compound rolling and accentuated twisting of the surface material under pressure. The compound rolling and twisting action has been found in practice to produce vastly improved packing of the surface material.

Still considering FIGURE 18B, the movements of the wheel associated with the chassis C2 are similar to those explained above with reference to the chassis C1. The successive positions of the wheel associated with the chassis C2 are indicated at W2(I); W2(II); W2(III) and W2(IV). The wheels of both chassis are continuously moving back and forth between skewed and tangential plane positions as they rotate with the chassis. However, it is again pointed out that the two chassis rotate in opposite directions.

Rotation of the chassis C1 and C2 with the eccentric devices E1 and E2 positioned as shown in FIGURE 18B not only produces the highly efficient packing effect due to the compound rolling and twisting movement, but also is effective for driving the machine as a whole to the right as indicated by the arrow R. It will be appreciated that each chassis wheel engages the surface being packed with considerable frictional contact so that whenever a wheel is not positioned in a tangential plane while rotating about the axis AX there will be a horizontal reaction tending to displace the wheel generally transversely to its plane of rotation about its axle. For convenience in considering the effects of the forces acting on the chassis C1 when the indicated wheel is in substantially skewed positions, circles P1 and P2 are shown as though being pressed against by the wheel in positions W1(I) and W1(III) respectively, thus schematically indicating the reactive forces exerted by the surface material. The circles P1 and P2 may conveniently be considered as short posts extending out of the ground in positions W1(I) and W1(III). In position W1(I) the wheel pressing against the resistance post P1 will produce a camming effect tending to move the wheel to the right away from the resistance post. Similarly, in position W1(III), the camming action between the wheel and the resistance post P2 will tend to move the wheel and the associated chassis C1 to the right. Similar considerations apply with respect to the wheel on the chassis C2, posts P'1 and P'2 representing the reactive forces exerted by the surface material upon the wheel in positions W2(I) and W2(III). In this case also, the reactive forces will displace the chassis C2 to the right. Both chassis C1 and C2 being urged to the right by the reactive forces, the entire machine as represented by the frame F will be driven in translation over the ground to the right as indicated by the arrow R.

In FIGURE 18C, the eccentric device E1 is again displaced to the left of the axis AX of the chassis C1, as in FIGURE 18B, so that the movements of the wheels and the reactive forces will be the same as explained in connection with FIGURE 18B. However, in FIGURE 18C, the eccentric device E2 associated with the chassis C2 is displaced to the opposite side of the axis AX, that is to the right thereof. In consequence, the rotation of the wheel on the chassis C2 and the reaction from the ground due to the skewed positions of the wheel will tend to drive the wheel to the left. Since the driving tendencies produced by the wheels on the two chassis are opposite, the driving forces will be balanced and the entire machine will remain stationary with the wheels rolling in substantially circular paths which do not change significantly. The forces exerted from time-to-time throughout rotation of each wheel and the skewing of each wheel back and forth during rotation are quite complex, and the driving of the machine in a straight line as in the direction of the arrow R in FIGURE 18B or the holding of the machine in a more or less stationary position as in FIGURE 18C may require some variations in the positions of the eccentrics E1 and E2. These adjustments may readily be effected by the operator from observation and according to "feel" in handling the two steering wheels 135.

In FIGURE 18D, both eccentrics E1 and E2 are shown displaced in the same direction from the axes of rotation AX, but transversely of the machine as distinguished from being displaced longitudinally of the machine as shown in FIGURE 18B. By comparing the skewing actions of the wheels and the resultant reactive forces between the ground and the wheels with those represented in FIGURE 18B, it will be apparent that the wheels on the two chassis C1 and C2 both tend to drive the machine as a whole transversely to its longitudinal axis as indicated by the arrow L in FIGURE 18D. Consequently, with the parts adjusted as indicated in FIGURE 18D, and with minor readjustment of the eccentrics E1 and E2 according to the observation and "feel" of the operator, the machine may be driven broadside, so to speak.

In FIGURE 18E, the eccentric E1 is positioned as shown in FIGURE 18D so that rotation of the chassis C1 tends to drive the left end of the frame downwardly as viewed on the drawing sheet. However, the eccentric E2 is displaced transversely from the associated axis AX in the opposite direction. Therefore, the rotation of the chassis C2 will produce such reactive forces as to tend to move the right end of the frame F upwardly on the drawing sheet. Consequently, the oppositely directed forces tending to move the left end of the frame in one transverse direction and to move the right end of the frame in the opposite transverse direction will produce an effective moment causing the entire machine to rotate in the direction of the arrow X about a central axis indicated at MC in FIGURE 18E.

In all of FIGURES 18B–18E, the skewed positions of the wheels are somewhat exaggerated. In practice, less maximum skewing is effective, and in many instances would be desirable.

While different relative settings of the eccentrics E1 and E2 have been indicated for respectively driving the machine longitudinally in one direction (FIGURE 18B), remaining stationary (FIGURE 18C), driving the machine transversely in one direction (FIGURE 18D) or rotating about the machine axis MC (FIGURE 18E), various combinations of movements of the machine itself may be achieved by different relative settings of the eccentrics E1 and E2 through separately operable steering wheels 135. Thus, the machine may be caused to travel more or less in a straight line while at the same time rotating about its axis MC, or it may be caused to move transversely of its longitudinal horizontal axis without rotating about the axis MC, or still further, it may be caused to move longitudinally of its horizontal axes without rotating about its axis MC. This enables the operator to maneuver the machine very flexible and exactly according to the surface to be packed and marginal obstructions such as building walls or curbs to be avoided. In actual use, the machine may be run very close to a wall or curb and then along another wall or curb at right angles to the first. The rolling and skewing of the wheels on both chassis act on the material in many directions producing compound pressure and packing forces which are extremely effective in providing an evenly and densely packed surface.

The great effectiveness of the combined rolling and twisting action may be appreciated by comparison with the action of ordinary or conventional rollers which move merely back and forth substantially in a straight line, even those known as vibrating rollers. In such more or less conventional constructions, the packing forces are exerted almost entirely vertically. Hence, such prior art rollers have little effectiveness in smoothing out local irregularities in the surface material. For example, when a conventional roller rolls over a triple or ridge in the material it merely presses it downwardly and any smoothing out effect is due to some lateral squeezing displacement which is not completely effective for producing a really smooth and level packed surface. On the other hand, the combined rolling and twisting forces exerted by constructions embodying the present invention produce definite levelling results as well as superior packing. For example, when a stone is at the top of a surface and substantially immediately above another stone, the twisting force tends to displace the upper stone to one side of the underlying stone instead of merely vertically pushing the underlying stone downwardly by pressure exerted through the surface stone. The displacement of the upper or surface stone to one side of the underlying stone produces a more uniform surface distribution of stones. Even as to fine particulate surface material, the twisting or kneading action and the resultant triaxial packing force produces a more efficiently packed surface than rolling or packing forces exerted almost exclusively vertically. The ability of machines embodying the invention to be driven in any horizontal direction at will enables the operator to maneuver the machine and cover the surface in whatever directions are required to eliminate any surface waviness, regardless of its direction or extent. Tests have demonstrated that corresponding packing effects can be produced with apparatus according to the invention of substantially one-half the weight and supplied with substantially one-half the power of the weight and power required for achieving comparable results with conventional equipment.

Machines embodying the invention can be used to advantage for packing surface materials of widely different kinds such as so-called hot paving mixes, cold slurry seals and even earth fills and loose stone. Speeds of operation may be varied within reasonable limits. Chassis rotative speeds in the neighborhood of 50 r.p.m. have produced good results for packing hot mix surface material, and speeds of about 25 r.p.m. for packing looser material such as soil, dirt and stone. Different rotative speeds of the chassis may be obtained by throttle control of the internal combustion motor M. Speeds of travel of the entire machine over the surface may be varied by changing the degrees or directions of eccentricity of the eccentric devices, and supplementally if desired by controlling the engine speed. No forward or reverse gears are required and no brakes are necessary, since the wheels on the two chassis C1 and C2 may be controlled to act against each other and the machine brought to and maintained at rest as has been made clear with reference to FIGURE 18C.

The drawings illustrate the wheels as being equipped with rubber tires. These have been found desirable for many applications, but other ground engaging wheel elements such as flat metal rims may be used, since these also exert surface as distinguished from point or line contact with the somewhat yieldable material being compacted. In a typical machine embodying the invention, the surface of a pneumatic tire in actual contact with the ground is substantially equivalent to the surface of a rectangle eight inches by twelve inches, the eight inch dimension being indicative of the radical width of tracking, and hence the width of the packing path. There is thus area contact and not point or line contact, and it is this area contact which contributes to the primary twisting action exerted on the surface material. A wider path of packing may be obtained by mounting different ones of the three wheels on one chassis or both at different radial distances from the chassis axis of rotation. This may be effected, for example, as described with reference to FIGURES 12A–12D.

The apparatus disclosed is representative of equipment for and procedures followed in practicing of the invention, but it is intended that the disclosure be illustrative rather than definitive, the invention being defined in the claims.

I claim:

1. In apparatus for compacting surface material, a frame; two chassis mounted by said frame for rotation about spaced substantially vertical axes; means on said frame for rotating said chassis in opposite directions; a plurality of ground engaging wheels; a plurality of pivot means on each chassis at circumferentially deployed locations thereon, said pivot means mounting a plurality of said wheels on said chassis in circumferentially deployed relation in separate substantially vertical planes and respectively mounting each of a plurality of said wheels for pivotal adjustment in opposite directions from a position in which its said plane is substantially tangential to the general path of rotation of said wheels about the chassis axis of rotation to positions skewed respectively in opposite directions with respect to said tangential position; means including two eccentric devices connected respectively to said two chassis and being shiftable in varying amounts and in different directions from positions concentric with the axes of rotation of the respective chassis and when so shifted being operable during rotation of said chassis for sequentially adjusting the pivot means on both chassis to adjust each associated wheel in one direction from said tangential position to one of said skewed positions, then in the opposite direction back to said tangential position and continuing in said opposite direction to the other skewed position, and then again in said one direction to said tangential position and so on cyclically; means for shifting said eccentric devices selected amounts of eccentricity; and separate individually operable steering means connected respectively to said eccentric devices for changing the direction of eccentricity of each of said eccentric devices independently of the direction of eccentricity of the other eccentric device.

2. In apparatus for compacting surface material, a frame; a chassis mounted by said frame for rotation about a substantially vertical axis; means on said frame for rotating said chassis; a plurality of ground engaging wheels; a plurality of pivot means on said chassis at circumferentially deployed locations thereon, said pivot means mounting said wheels on said chassis in circumferentially deployed relation in separate substantially vertical planes and respectively mounting each of a plurality of said wheels for pivotal adjustment in opposite directions from a position in which its said plane is substantially tangential to the general path of rotation of said wheels about the chassis axis of rotation to positions skewed respectively in opposite directions with respect to said tangential position; a parallelogram linkage comprising a relatively fixed bar, a floating bar, and two links pivoted at their opposite ends respectively to the opposite ends of said bars; means for mounting said relatively fixed bar on said frame; a first eccentric device member on said floating bar; a second eccentric device member rotatably engaging said first eccentric device member; means for swinging said links for moving said floating bar to vary the position of said eccentric device members horizontally relatively to the chassis axis of rotation; means respectively connecting said second eccentric device member to said pivot means for adjusting said wheels in said opposite directions in response to rotation of said chassis when said eccentric device members are positioned eccentrically with respect to said chassis axis of rotation; and ground engaging wheel means, in addition to said chassis and the wheels mounted on said chassis, for supporting said frame on the ground in horizontally spaced relation to the ground engaging support provided by said chassis and the wheels mounted on said chassis.

3. In apparatus for compacting surface material, a frame; a hollow drive shaft mounted on said frame for rotation about a substantially vertical axis; a chassis mounted on the lower end of said hollow drive shaft for rotation therewith; means on said frame for rotating said hollow drive shaft and chassis; a plurality of ground engaging wheels; a plurality of pivot means on said chassis at circumferentially deployed locations thereon, said pivot means mounting said wheels on said chassis in circumferentially deployed relation in separate substantially vertical planes and respectively mounting each of a plurality of said wheels for pivotal adjustment in opposite directions from a position in which its said plane is substantially tangential to the general path of rotation of said wheels about the chassis axis of rotation to positions skewed respectively in opposite directions with respect to said tangential position; a lever extending vertically through said hollow drive shaft; means within said hollow drive shaft mounting said lever between the upper and lower ends thereof for universal pivotal movements about different horizontal axes; an eccentric device on the lower end of said lever; means respectively connecting said eccentric device to said pivot means for adjusting said wheels in said opposite directions in response to rotation of said chassis when said eccentric device is positioned eccentrically with respect to said chassis axis of rotation; two fluid pressure jacks mounted on said frame with their lines of action at an angle to one another; means connecting said jacks to the upper end of said lever for rocking said lever by operation of said jacks to vary both the amount and the direction of eccentricity of said eccentric device relatively to said chassis axis of rotation; and ground engaging wheel means, in addition to said chassis and the wheels mounted on said chassis, for supporting said frame on the ground in horizontally spaced relation to the ground engaging support provided by said chassis and the wheels mounted on said chassis.

4. In apparatus for compacting surface material, a frame; a bearing unit; trunnion means mounting said bearing unit on said frame to rock floatingly about a substantially horizontal axis; a chassis mounted by said bearing unit for rotation about a substantially vertical axis; an operating shaft mounted on said frame to rotate about a substantially horizontal axis; a second shaft journalled by said bearing unit to rotate about an axis approximately aligned with the operating shaft axis; a universal joint connecting said operating shaft to said second shaft; means for transmitting drive from said second shaft to said chassis; a plurality of ground engaging wheels; a plurality of pivot means on said chassis at circumferentially deployed locations thereon, said pivot means mounting said wheels on said chassis in circumferentially deployed relation in separate substantially vertical planes and respectively mounting each of a plurality of said wheels for pivotal adjustment in opposite directions from a position in which its said plane is substantially tangential to the general path of rotation of said wheels about the chassis axis of rotation to positions skewed respectively in opposite directions with respect to said tangential position; means operable during rotation of said chassis for sequentially adjusting said pivot means to adjust each wheel in one direction from said tangential position to one of said skewed positions, then in the opposite direction back to said tangential position and continuing in said opposite direction to the other skewed position, and then again in said one direction to said tangential position and so on cyclically; and ground engaging wheel means, in addition to said chassis and the wheels mounted on said chassis, for supporting said frame on the ground in horizontally spaced relation to the ground engaging support provided by said chassis and the wheels mounted on said chassis.

5. In apparatus for compacting surface material, a frame; a chassis mounted by said frame for rotation about a substantially vertical axes; means on said frame for rotating said chassis; a plurality of pintles mounted on said chassis in circumferentially deployed relation and with their respective axes substantially horizontal and tangential to the circle of rotation of the parts of said chassis where said pintles are mounted; a plurality of members respectively mounted on said pintles for rocking about said pintle axes; a plurality of axles respectively pivotally mounted on said members for rocking about substantially vertical axes off-set from said pintle axes; a plurality of ground engaging wheels respectively journalled on said axles; means for rocking said members about said pintle axes for adjusting said wheels from vertical planes to off-vertical planes; means responsive to rotation of said chassis for rocking said axles about their substantially vertical pivotal axes in a predetermined cyclic pattern from positions in which said axles are substantially radial with respect to said chassis to positions skewed in opposite directions from said radial positions; and ground engaging wheel means, in addition to said chassis and the wheels mounted on said chassis, for supporting said frame on the ground in horizontally spaced relation to the ground engaging support provided by said chassis and the wheels mounted on said chassis.

6. In apparatus for compacting surface material, a frame; a chassis mounted by said frame for rotation about a substantially vertical axis; means on said frame for rotating said chassis; a plurality of axles mounted on said chassis in circumferentially deployed relation to rock about substantially vertical axes from positions in which said axles are substantially radial with respect to said chassis to positions skewed in opposite directions from said radial positions; a plurality of wheels having ground engaging rims; means respectively mounting said wheels on said axles and including means for adjusting the radial distance of at least one of said rims from the chassis axis of rotation; means responsive to rotation of said chassis for rocking said axles about their pivotal axes in a predetermined cyclic pattern from positions in which said axles are substantially radial with respect to said chassis to positions skewed in opposite directions from said radial positions; and ground engaging wheel means, in addition to said chassis and the wheels mounted on said chassis, for supporting said frame on the ground in horizontally spaced relation to the ground engaging support provided by said chassis and the wheels mounted on said chassis.

7. In apparatus for compacting surface material, a frame; a chassis mounted by said frame for rotation about a substantially vertical axis; means on said frame for rotating said chassis; a plurality of axles mounted on said chassis in circumferentially deployed relation to rock about substantially vertical axes from positions in which said axles are substantially radial with respect to said chassis to positions skewed in opposite directions from said radial positions; a plurality of wheels having hubs and ground engaging rims; means respectively mounting said wheels on said axles and including means for selectively spacing at least one of said hubs along its associated axle for thereby adjusting the radial distance of the associated rim from the chassis axis of rotation; means responsive to rotation of said chassis for rocking said axles about their pivotal axes in a predetermined cyclic pattern from positions in which said axles are substantially radial with respect to said chassis to positions skewed in opposite directions from said radial positions; and ground engaging wheel means, in addition to said chassis and the wheels mounted on said chassis, for supporting said frame on the ground in horizontally spaced relation to the ground engaging support provided by said chassis and the wheels mounted on said chassis.

8. In apparatus for compacting surface material, a frame; a chassis mounted by said frame for rotation about a substantially vertical axis; means on said frame for rotating said chassis; a plurality of ground engaging wheels; a plurality of pivot means on said chassis at circumferentially deployed locations thereon, said pivot means mounting said wheels on said chassis in circumferentially deployed relations in separate substantially vertical planes and respectively mounting each of a plurality of said wheels for pivotal adjustment in opposite directions from a position in which its said plane is substantially tangential to the general path of rotation of said wheels about the chassis axis of rotation to positions skewed respectively in opposite directions with respect to said tangential position; an eccentric device comprising a first eccentric member and a second eccentric member rotatably engaging said first eccentric member; means for mounting said first eccentric member on said frame eccentrically with respect to said chassis axis of rotation; a plurality of links connecting said second eccentric member respectively to said pivot means for adjusting said wheels in said opposite directions in response to rotation of said chassis, one of said links being fixedly connected to said second eccentric member and the others of said links being pivotally connected to said second eccentric member; and ground engaging wheel means, in addition to said chassis and the wheels mounted on said chassis, for supporting said frame on the ground in horizontally spaced relation to the ground engaging support provided by said chassis and the wheels mounted on said chassis.

9. In apparatus for compacting surface material, a frame; two chassis mounted by said frame for rotation about spaced substantially vertical axes; means on said frame for rotating said chassis in opposite directions; a plurality of ground engaging wheels; a plurality of pivot means on each chassis at circumferentially deployed locations thereon, said pivot means mounting a plurality of said wheels on said chassis in circumferentially deployed relation in separate substantially vertical planes and respectively mounting each of a plurality of said wheels for pivotal adjustment in opposite directions from a position in which its said plane is substantially tangential to the general path of rotation of said wheels about the chassis axis of rotation to positions skewed respectively in opposite directions with respect to said tangential position; means including two eccentric devices connected respectively to said two chassis and being shiftable in varying amounts and in different directions from positions concentric with the axes of rotation of the respective chassis and when so shifted being operable during rotation of said chassis for sequentially adjusting the pivot means on both chassis to adjust each associated wheel in one direction from said tangential position to one of said skewed positions, then in the opposite direction back to said tangential position and continuing in said opposite direction to the other skewed position, and then again in said one direction to said tangential position and so on cyclically; means for shifting said eccentric devices selected amounts of eccentricity; two separate individually manually operable steering members mounted on said frame in proximity to one another and both being accessible to an operator on said frame; and separate operating connections interposed between and individually connecting said manually operable steering members to the respective eccentric devices for enabling the direction of eccentricity of each of said eccentric devices to be changed independently of the direction of the other eccentric device.

10. In apparatus for compacting surface material, a frame; a bearing unit; trunnion means mounting said bearing unit on said frame to rock floatingly about a substantially horizontal axis; a chassis mounted by said bearing unit for rotation about a substantially vertical axis; means accommodatable to floating rocking movement of said bearing unit on said frame for transmitting drive to said chassis for rotating the latter; a plurality of ground engaging wheels; a plurality of pivot means on said chassis at circumferentially deployed locations thereon, said pivot means mounting said wheels on said chassis in circumferentially deployed relation in separate substantially vertical planes and respectively mounting each of a plurality of said wheels for pivotal adjustment in opposite directions from a position in which its said plane is substantially tangential to the general path of rotation of said wheels about the chassis axis of rotation to positions skewed respectively in opposite directions with respect to said tangential position; means operable during rotation of said chassis for sequentially adjusting said pivot means to adjust each wheel in one direction from said tangential position to one of said skewed positions, then in the opposite direction back to said tangential position and continuing in said opposite direction to the other skewed position, and then again in said one direction to said tangential position and so on cyclically; and ground engaging wheel means, in addition to said chassis and the wheels mounted on said chassis, for supporting said frame on the ground in horizontally spaced relation to the ground engaging support provided by said chassis and the wheels mounted on said chassis.

11. In apparatus for compacting surface material, a frame; a chassis mounted by said frame for rotation about a substantially vertical axis; means on said frame for rotating said chassis; a plurality of axles; a plurality of pivot means on said chassis at circumferentially deployed locations thereon, said pivot means mounting said axles on said chassis in circumferentially deployed relation extending outwardly from said axis and for rocking both vertically and horizontally relatively to said chassis; a plurality of wheels respectively journalled on said axles; means for rocking said axles vertically for adjusting said wheels from vertical planes to off-vertical planes; means responsive to rotation of said chassis for rocking said axles horizontally in a predetermined cyclic pattern to adjust each wheel from a position substantially tangential to the general path of rotation of the wheels to positions skewed respectively in opposite directions with respect to said tangential position; and ground engaging wheel means, in addition to said chassis and the wheels mounted on said chassis, for supporting said frame on the ground in horizontally spaced relation to the ground engaging support provided by said chassis and the wheels mounted on said chassis.

12. In apparatus for compacting surface material, a frame; a chassis mounted by said frame for rotation about a substantially vertical axis; means on said frame for rotating said chassis; a plurality of ground engaging wheels; a plurality of pivot means on said chassis at circumferentially deployed locations thereon, said pivot means mounting said wheels on said chassis in circumferentially deployed relation in separate substantially vertical planes and respectively mounting each of a plurality of said wheels for pivotal adjustment in opposite directions from a position in which its said plane is substantially tangential to the general path of rotation of said wheels about the chassis axis of rotation to positions skewed respectively in opposite directions with respect to said tangential position; an eccentric device comprising a first eccentric member and a second eccentric member rotatably engaging said first eccentric member; means for mounting said first eccentric member on said frame eccentrically with respect to said chassis axis of rotation; a plurality of links connecting said second eccentric member respectively to said pivot means for adjusting said wheels in said opposite directions in response to rotation of said chassis, one of said links being fixedly connected to said second eccentric member with the center line of said one of said links passing through the axis of rotation of said second eccentric member on said first eccentric member, and the others of said links being pivotally connected to said second eccentric member; and ground engaging wheel means, in addition to said chassis and the wheels mounted on said chassis, for supporting said frame on the ground in horizontally spaced relation to the ground engaging support provided by said chassis and the wheels mounted on said chassis.

13. In apparatus for compacting surface material, a frame; a chassis mounted by said frame for rotation about a substantially vertical axis; and means on said frame for rotating said chassis; a plurality of ground engaging wheels; a plurality of pivot means on said chassis at circumferentially deployed locations thereon, said pivot means mounting said wheels on said chassis in circumferentially deployed relation in separate substantially vertical planes and respectively mounting each of a plurality of said wheels for pivotal adjustment in opposite directions from a position in which its said plane is substantially tangential to the general path of rotation of said wheels about the chassis axis of rotation to positions skewed respectively in opposite directions with respect to said tangential position; a parallelogram linkage comprising a relatively fixed bar, a floating bar, and two links pivoted at their opposite ends respectively to the opposite ends of said bars; means for mounting said relatively fixed bar on said frame for turning adjustment about a substantially vertical axis; a first eccentric device member on said floating bar; a second eccentric device member rotatably engaging said first eccentric device member; means for swinging said links for moving said floating bar to vary the position of said eccentric device members horizontally relatively to the chassis axis of rotation; steering means on said frame for turning said fixed bar relatively to said frame for varying the direction of eccentricity of said eccentric device members relatively to the chassis axis of rotation; means respectively connecting said second eccentric device member to said pivot means for adjusting said wheels in said opposite directions in response to rotation of said chassis when said eccentric device members are positioned eccentrically with respect to said chassis axis of rotation; and ground engaging wheel means, in addition to said chassis and the wheels mounted on said chassis, for supporting said frame on the ground in horizontally spaced relation to the ground engaging support provided by said chassis and the wheels mounted on said chassis.

References Cited by the Examiner

UNITED STATES PATENTS

| | | | |
|---|---|---|---|
| 2,037,069 | 4/1936 | Ehrhart | 170—148 |
| 2,182,102 | 12/1939 | Tinker | 180—77 |
| 2,419,308 | 4/1947 | Austin | 94—45 X |
| 2,614,637 | 10/1952 | Landgraf | 170—160.13 |
| 2,898,826 | 8/1959 | Livermont | 94—45 |
| 3,016,966 | 1/1962 | Hansen | 180—26 |
| 3,050,274 | 8/1962 | Haight | 170—160.24 |
| 3,080,001 | 3/1963 | Culver et al. | 170—160.13 |

FOREIGN PATENTS 319,963   10/1929   Great Britain.

CHARLES E. O'CONNELL, *Primary Examiner.*

JACOB L. NACKENOFF, *Examiner.*